(12) United States Patent
Suyama

(10) Patent No.: US 10,637,116 B2
(45) Date of Patent: Apr. 28, 2020

(54) AIR CELL

(71) Applicant: TOYOTA JIDOSHA KABUSHIKI KAISHA, Toyota-shi, Aichi-ken (JP)

(72) Inventor: Hiroshi Suyama, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 58 days.

(21) Appl. No.: 14/851,533

(22) Filed: Sep. 11, 2015

(65) Prior Publication Data

US 2016/0087320 A1 Mar. 24, 2016

(30) Foreign Application Priority Data

Sep. 19, 2014 (JP) .................................. 2014-191409

(51) Int. Cl.
| | |
|---|---|
| *H01M 12/08* | (2006.01) |
| *H01M 4/24* | (2006.01) |
| *H01M 8/083* | (2016.01) |
| *H01M 12/06* | (2006.01) |

(52) U.S. Cl.
CPC ........... *H01M 12/08* (2013.01); *H01M 4/248* (2013.01); *H01M 8/083* (2013.01); *H01M 12/06* (2013.01); *H01M 2300/0014* (2013.01); *Y02E 60/128* (2013.01)

(58) Field of Classification Search
CPC ...... H01M 12/08; H01M 4/248; H01M 8/083; H01M 12/06; H01M 2300/0014; Y02E 60/128
See application file for complete search history.

(56) References Cited

U.S. PATENT DOCUMENTS

| | | | | |
|---|---|---|---|---|
| 6,033,343 | A | * | 3/2000 | Licht ...................... H01M 4/36 429/209 |
| 2003/0186099 | A1 | * | 10/2003 | Liu ...................... H01M 2/1223 429/407 |
| 2009/0000574 | A1 | * | 1/2009 | Sugimasa ............. B60L 11/184 123/3 |
| 2011/0318657 | A1 | * | 12/2011 | Ein-Eli ................... H01M 4/38 429/405 |
| 2012/0082922 | A1 | | 4/2012 | Yamaki et al. |
| 2015/0028516 | A1 | * | 1/2015 | Duong ................ H01M 2/1686 264/173.19 |

FOREIGN PATENT DOCUMENTS

| | | |
|---|---|---|
| JP | 2010-140736 A | 6/2010 |
| JP | 2012-094509 A | 5/2012 |
| WO | 2011/001287 A2 | 1/2011 |

OTHER PUBLICATIONS

Andersson, B. O., and Lars Öjefors. "Slow potentiodynamic studies of porous alkaline iron electrodes." Journal of the Electrochemical Society 123.6 (1976): 824-828. (Year: 1976).*

* cited by examiner

*Primary Examiner* — Brian R Ohara
(74) *Attorney, Agent, or Firm* — Oliff PLC

(57) ABSTRACT

Disclosed is an air cell with higher energy density than before. An air cell comprises an electrolyte solution containing a potassium hydroxide solution having a pH of 17.3 or more under a temperature condition of 23° C., an anode containing iron, and a cathode.

17 Claims, 8 Drawing Sheets

AIR CELL

TECHNICAL FIELD

The present invention relates to an air cell with higher energy density than before.

BACKGROUND ART

In the conventional liquid air cell, there is a problem that when iron is used as an anode active material, oxide and hydroxide are precipitated on an iron surface and thus cycling performance decreases. Therefore, studies have been carried out into the increase in pulverization, etc. of the anode active material. Patent Literature 1 discloses a metal-air battery using a composite electrode material as an anode active material, the composite electrode material having a carbon base material and iron oxide particles mainly containing $Fe_3O_4$ and being supported on the carbon base material and the particles have a $D_{90}$ of 50 nm or less.

CITATION LIST

Patent Literature 1: Japanese Patent Application Laid-Open No. 2012-094509

SUMMARY OF INVENTION

Technical Problem

When the anode supporting the iron oxide particles having a $D_{90}$ of 50 nm or less on the carbon base material is used similarly as Patent Literature 1, the anode contains the carbon base material and voids between the iron oxide particles except the iron oxide particles being the anode active material, and thus the filling rate of the electrode active material in the anode decreases. Therefore, it is difficult to achieve high energy density.

The present invention was made in view of the above circumstances in which when fine particles containing iron are used as an anode active material, it is difficult to achieve high energy density, and it is an object of the present invention to provide an air cell with higher energy density than before without pulverization of the anode active material.

Solution to Problem

The first air cell of the present invention comprises an electrolyte solution containing a potassium hydroxide solution having a pH of 17.3 or more under a temperature condition of 23° C., an anode containing iron, and a cathode.

In the first air cell of the present invention, the potassium hydroxide solution preferably has a pH of 17.3 or more and 18.4 or less.

The second air cell of the present invention comprises an electrolyte solution containing a potassium hydroxide solution having a concentration of 12.5 mol/L or more, an anode containing iron, and a cathode.

In the second air cell of the present invention, the potassium hydroxide solution preferably has a concentration of 12.5 mol/L or more and 15.1 mol/L or less.

The third air cell of the present invention comprises an electrolyte solution containing a potassium hydroxide solution having an iron solubility of 263.6 µg/mL or more under a temperature condition of 23° C., an anode containing iron, and a cathode.

In the third air cell of the present invention, the potassium hydroxide solution preferably has an iron solubility of 263.6 µg/mL or more and 393.5 µg/mL or less.

Advantageous Effects of Invention

According to the present invention, by using a strongly-basic potassium hydroxide solution having a pH of 17.3 or more for an electrolyte solution, an iron reaction rate can be increased, thereby obtaining an air cell with high energy density.

DESCRIPTION OF EMBODIMENTS

Figure 1:
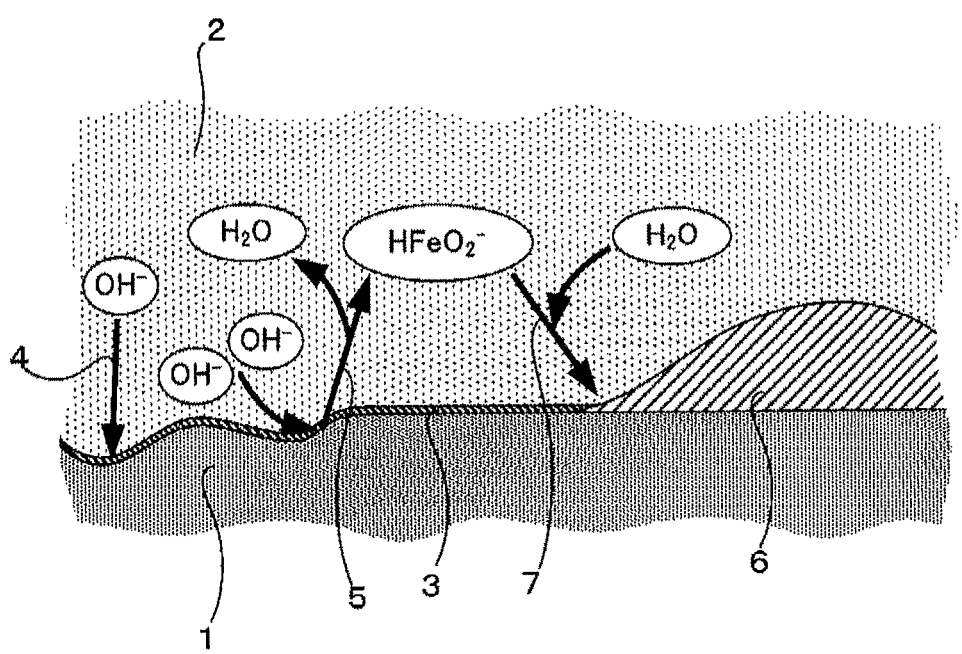
FIG. 1 is a part of a schematic sectional view at the time of discharge in an air cell comprising an anode containing iron and an electrolyte solution containing a potassium hydroxide solution.

The first air cell of the present invention comprises an electrolyte solution containing a potassium hydroxide solution having a pH of 17.3 or more under a temperature condition of 23° C., an anode containing iron, and a cathode.

The second air cell of the present invention comprises an electrolyte solution containing a potassium hydroxide solution having a concentration of 12.5 mol/L or more, an anode containing iron, and a cathode.

The third air cell of the present invention comprises an electrolyte solution containing a potassium hydroxide solution having an iron solubility of 263.6 µg/mL or more under a temperature condition of 23° C., an anode containing iron, and a cathode.

The first to third air cells have a commonality in comprising an electrolyte solution containing a potassium hydroxide solution having specific characteristics, an anode containing iron, and a cathode. Hereinafter, the features of the first, second and third air cells (characteristics of the potassium hydroxide solution) will be described first, and the commonality of the above three inventions will be described later. The first, second and third air cells may collectively refer to "air cell of the present invention".

The main feature of the air cell of the present invention is to use a potassium hydroxide solution having specific characteristics as an electrolyte solution. The conventional iron-air cell had a problem that a reaction did not sufficiently proceed in a depth direction of iron, thereby decreasing an iron reaction rate. The inventor of the present invention has focused attention on three parameters: (1) pH of a potassium hydroxide solution; (2) concentration of a potassium hydroxide solution; and (3) iron solubility in a potassium hydroxide solution, and has found out that by allowing at least one of the above parameters to satisfy a specific condition, an iron reaction rate increases, thereby obtaining an air cell with high energy density.

The pH of the potassium hydroxide solution used for the first air cell of the present invention is 17.3 or more under a temperature condition of 23° C. By using such a potassium hydroxide solution having high pH, as will be described later in the explanation of mechanism, it is considered that change in chemical composition, morphology and structure of an anode active material surface is facilitated and thus the precipitation of a discharge product is delayed, thereby high energy density can be achieved. To the contrary, when a potassium hydroxide solution having a pH of less than 17.3 is used, chemical composition, morphology and structure of an anode active material surface are not sufficiently changed, so that the anode active material surface is covered with a dense discharge product and thus the reaction is inhibited. Thereby, it is considered that a desired energy density cannot be obtained.

In the first air cell of the present invention, the pH of the potassium hydroxide solution is preferably 17.3 or more and 18.4 or less. If the pH of the potassium hydroxide solution exceeds 18.4, the potassium hydroxide solution become supersaturated, and the solid of the potassium hydroxide may be precipitated.

The pH of the potassium hydroxide solution can be obtained by calculation or measurement.

When the pH of the potassium hydroxide solution is calculated, first, the concentration of the potassium hydroxide solution is measured by the below-described method under a temperature condition of 23° C., and the concentration is converted to pH using the following formula (1). For the details, Formula 14 in Anal. Chem. 1985, 57, 514 is useful as a reference.

$$pH=14.00-\log(a_w/f_{\pm KOH} m_{KOH}) \quad \text{Formula (1):}$$

In Formula (1), $a_w$ is water activity, $f_{\pm KOH}$ is mol activity coefficient of KOH aqueous solution, and $m_{KOH}$ is mol concentration of KOH aqueous solution.

When the pH of the potassium hydroxide solution is obtained by measurement, the measurement is conducted based on the method of pH measurement mentioned in JISZ 8802. Specifically, as mentioned in JISZ 8802 7.3.2 f), a pH standard solution for preparing carbonate is prepared from sodium hydrogen carbonate, and the pH of the potassium hydroxide solution is measured under a temperature condition of 23° C. using a pH meter conducted through the test mentioned in JISZ 8802 8.1 a) and b) based on the measurement method mentioned in JISZ 8802 8.2.

The concentration of the potassium hydroxide solution used for the second air cell of the present invention is 12.5 mol/L or more. By using such a potassium hydroxide solution having high concentration, as will be described later in the explanation of mechanism, it is considered that change in chemical composition, morphology and structure of an anode active material surface is facilitated and thus the precipitation of a discharge product is delayed, thereby high energy density can be achieved. To the contrary, when a potassium hydroxide solution having a concentration of less than 12.5 mol/L is used, chemical composition, morphology and structure of an anode active material surface are not sufficiently changed, so that the anode active material surface is covered with a dense discharge product and thus the reaction is inhibited. Thereby, a desired energy density cannot be obtained.

In the second air cell of the present invention, the concentration of the potassium hydroxide solution is preferably 12.5 mol/L or more and 15.1 mol/L or less. If the concentration of the potassium hydroxide solution exceeds 15.1 mol/L, the potassium hydroxide solution become supersaturated, and the solid of the potassium hydroxide may be precipitated.

The concentration of the potassium hydroxide solution can be calculated from a specific gravity at 15° C.

The iron solubility in the potassium hydroxide solution used for the third air cell of the present invention is 263.6 µg/mL or more under a temperature condition of 23° C. By using such a potassium hydroxide solution having high iron solubility, as will be described later in the explanation of mechanism, it is considered that change in chemical composition, morphology and structure of an anode active material surface is facilitated and thus the precipitation of a discharge product is delayed, thereby high energy density can be achieved. To the contrary, when a potassium hydroxide solution having an iron solubility of less than 263.6 µg/mL is used, chemical composition, morphology and structure of an anode active material surface are not sufficiently changed, so that the anode active material surface is covered with a dense discharge product and thus the reaction is inhibited. Thereby, a desired energy density cannot be obtained.

In the third air cell of the present invention, the iron solubility in the potassium hydroxide solution is preferably 263.6 µg/mL or more and 393.5 µg/mL or less. If the iron solubility in the potassium hydroxide solution exceeds 393.5 µg/mL, the potassium hydroxide solution become supersaturated, and the solid of the potassium hydroxide may be precipitated.

The iron solubility in the potassium hydroxide solution is obtained by the following measurement method. First, 0.06 g of FeS is added to 10 mL of a potassium hydroxide solution. The obtained mixture is agitated for 30 minutes with an ultrasonic washing machine to prepare an iron-saturated solution. After centrifuging (4,000 rpm; 10 minutes) the obtained iron saturated solution, a supernatant solution is appropriately diluted with dilute nitric acid, and the quantity of Fe is determined by ICP mass spectrometry. As an analyzer, for example, ELEMENT XR (product name; manufactured by Thermo Fisher Scientific) can be used.

Hereinafter, common items of the potassium hydroxide solution used for the air cell of the present invention will be described.

The potassium hydroxide solution used in the present invention is preferably an aqueous solution, more preferably a potassium hydroxide aqueous solution.

When the potassium hydroxide solution is used as an electrolyte solution, in order to facilitate a discharge reaction, an additive may be appropriately added therein. As an additive, for example, $K_2S$ can be used. In the air cell, the following step is generally performed: a reduction treatment is performed at a cathode potential before discharge, and then a passive film mainly covering an anode surface is removed. If the electrolyte solution containing no $K_2S$ is used, the anode surface is covered with the passive film again; therefore a discharge reaction may not proceed. By adding $K_2S$ into the electrolyte solution, an adsorption layer containing sulfur is formed on the anode surface. Thereby, the formation of the passive film on the anode surface can be prohibited, so that discharge reaction rapidly proceeds.

The concentration of $K_2S$ is not particularly limited, as long as it is a concentration which does not inhibit an electrode reaction and can prevent the formation of the passive film on the anode surface. For example, the concentration is preferably 0.01 mol/L.

Hereinafter, the mechanism of the anode reaction in the air cell of the present invention will be described.

The following formula (2) is a reaction formula of the anode reaction in the air cell comprising an anode containing iron and an electrolyte solution containing a potassium hydroxide solution. An arrow from the left-sided formula to the right-sided formula indicates a discharge reaction, and an arrow from the right-sided formula to the left-sided formula indicates a charge reaction.

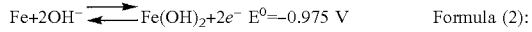  Formula (2):

The three staged elementary reactions represented by the following formulae (2a) to (2c) are involved in the anode reaction in the above formula (2) (J. Power Sources, 155, 2006, 461).

  Formula (2a):

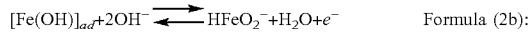  Formula (2b):

  Formula (2c):

FIG. 1 is a part of a schematic sectional view at the time of discharge in an air cell comprising an anode containing iron and an electrolyte solution containing a potassium hydroxide solution (hereinafter, referred to as a potassium hydroxide electrolyte solution). The elementary reactions in the above formulae (2a) to (2c) will be described with reference to FIG. 1.

FIG. 1 is a part of a schematic sectional view showing a solid-liquid interface of an anode 1 containing iron (Fe) and a potassium hydroxide electrolyte solution 2. First, iron in the anode 1 and hydroxide ions in the potassium hydroxide electrolyte solution 2 are reacted to generate $[Fe(OH)]_{ad}$ (3 in FIG. 1) (the above formula (2a), arrow 4 in FIG. 1). $[Fe(OH)]_{ad}$ is adsorption species to an anode surface. Next, the adsorption species and the hydroxide ions are further reacted to generate $HFeO_2^-$ and water (the above formula (2b), arrow 5 in FIG. 1). Unlike $[Fe(OH)]_{ad}$, $HFeO_2^-$ is separated from the anode surface and is dispersed in the potassium hydroxide electrolyte solution 2. Then, $HFeO_2^-$ and water are reacted to generate $Fe(OH)_2$ (6 in FIG. 1) (the above formula (2c), arrow 7 in FIG. 1).

As described above, the anode reaction in the above formula (2) proceeds through $HFeO_2^-$ being an intermediate product of the above formula (2b). Therefore, it is considered that iron solubility in the potassium hydroxide electrolyte solution is increased to generate larger amount of $HFeO_2^-$, thereby facilitating a discharge reaction.

Figure 6:
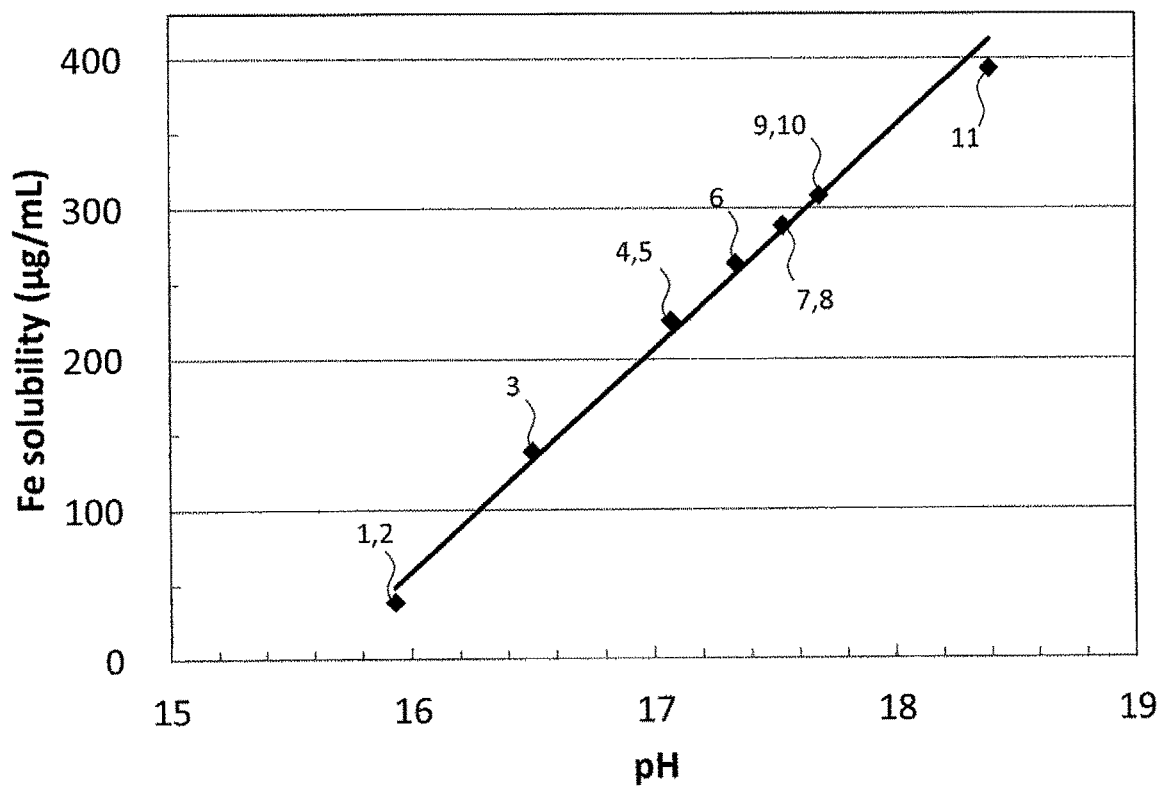
FIG. 6 is a graph showing a relationship between pH of a potassium hydroxide electrolyte solution and iron solubility (µg/mL) in the potassium hydroxide electrolyte solution.

As shown in FIG. 6 that will be described later, in the potassium hydroxide electrolyte solution, the iron solubility is increased in proportion to pH. Therefore, if pH is sufficiently high, $HFeO_2^-$ is temporarily supersaturated on the solid-liquid interface (that is, between the anode surface and the potassium hydroxide electrolyte solution), so that distribution of $HFeO_2^-$ is likely extended by natural diffusion. Then, the overall time for which $HFeO_2^-$ reaches supersaturation is delayed, thereby delaying a precipitation rate of $Fe(OH)_2$ to the elution rate of iron (Fe). This is an estimated mechanism in which pH is increased above a certain level (or, iron solubility is increased above a certain level), so that $Fe(OH)_2$ is less likely to precipitate.

The reason for inhibiting the precipitation of $Fe(OH)_2$ is considered attributable to improvement of solubility of iron compound such as $Fe(OH)_2$ and $Fe_2O_3$ besides the above described natural diffusion of $HFeO_2^-$. Also, as described in Examples below, change in chemical composition, morphology and structure of a discharge product is considered as one of the reasons in which the precipitation of $Fe(OH)_2$ is inhibited, so that more iron surfaces having high reaction activity are appeared on the anode surface.

The iron reaction rate in the present invention means a ratio (%) of capacity obtained by the actual measurement to theoretical capacity (960 mAh/g) of iron II) ions ($Fe^{2+}$). It means that if the iron reaction rate is higher, more iron in the substrate is diluted into the potassium hydroxide electrolyte solution as divalent iron ions, thereby obtaining high energy density. The iron reaction rate in the present invention can be obtained by the following discharge evaluation. First, an evaluation cell is produced using the materials described below.

Working Electrode: Anode Active Material Containing Iron

Reference electrode: Electrode obtained by charging a potassium hydroxide aqueous solution having the same KOH concentration as that of an electrolyte solution into a mercury/mercury oxide electrode (Hg/HgO)

Counter Electrode: Platinum Mesh

Electrolyte solution: Solution obtained by dissolving $K_2S$ at a concentration of 0.01 mol/L in a potassium hydroxide aqueous solution Separator Next, a reduction pretreatment is performed using the above-produced evaluation cell. As the reduction pretreatment, a potential treatment is performed for 10 to 30 minutes under the potential condition of −1.1 to −1.2 V vs. Hg/HgO.

Then, a discharge evaluation is performed using the evaluation cell under the following condition.

Evaluation apparatus: Multipotentiostat/Galvanostat VMP3 (product name; manufactured by Bio-Logic Science Instruments SAS)

Discharge current: 27 mA

Cut voltage: 0 V vs. Hg/HgO

Temperature: 25° C.

The iron reaction rate can be obtained by the following formula (3).

Iron reaction rate=(capacity $A$)/theoretical capacity (960 mAh/g) of $Fe^{2+}$  Formula (3):

In the above formula, capacity A means one of a capacity of the first plateau and a capacity of −0.76 V vs. Hg/HgO.

Herein, the capacity of the first plateau corresponds to the capacity in the reaction (discharge reaction) from the left-sided formula to the right-sided formula in the above formula (2). Also, if the discharge reaction further proceeds from the above formula (2), an oxidation reaction proceeds, and then the reactions in the following formulae (4) and/or (5) proceed.

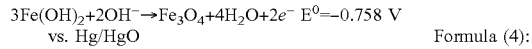
$3Fe(OH)_2 + 2OH^- \rightarrow Fe_3O_4 + 4H_2O + 2e^-$  $E^0 = -0.758$ V vs. Hg/HgO    Formula (4):

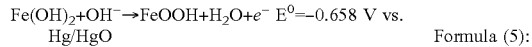
$Fe(OH)_2 + OH^- \rightarrow FeOOH + H_2O + e^-$  $E^0 = -0.658$ V vs. Hg/HgO    Formula (5):

In the discharge reaction, generally, two or more plateaus are confirmed. However, it can be considered that only one plateau, that is, only the plateau corresponding to the discharge reaction of the above formula (2) may be confirmed. In such a case, the iron reaction rate can be obtained by the capacity of −0.76 V vs. Hg/HgO before the oxidation reaction proceeds from iron (II) to iron (III) (the above formula (4)).

The anode used in the present invention contains iron. In the present invention, the anode "containing iron" means that the anode contains iron and/or the compound thereof. Specifically, it means that the anode contains at least one of the materials selected from the group consisting of iron metal, iron alloy and iron compounds.

The mass ratio of iron and/or the compound thereof in the anode accounts for preferably 10% by mass or more and 100% by mass or less, more preferably 30% by mass or more and 100% by mass or less, further more preferably 50% by mass or more and 100% by mass or less. Hydrogen storage alloys may be mixed with the anode to be used.

The form of the anode active material which can be used in the present invention is not particularly limited, there may be selected from a plate form, a line form, and a particle form.

In the present invention, to achieve high energy density, it is preferable to increase the iron filling rate in the anode together with the increase in the iron reaction rate. From the viewpoint of increase in filling rate, the average diameter of the anode active material accounts for preferably 0.1 μm or more and 1 mm or less, more preferably 1 μm or more and 100 μm or less, further more preferably 10 μm or more and 20 μm or less. "Average diameter of anode active material" as used herein means an average length going from one side of the anode active material to the other side. If the shape of the anode active material is in the plate form, "average diameter of anode active material" means an average thickness of the anode active material. If the shape of the anode active material is in the line form, "average diameter of anode active material" means an average wire diameter of the anode active material. If the shape of the anode active material is in the particle form, "average diameter of anode active material" means an average particle diameter of the anode active material.

As described above, by setting the average diameter of the anode active material be 0.1 μm or more and 1 mm or less, the thickness of the anode is not increased, and a carrier for supporting the anode active material is not required, thereby the iron filling rate in the anode can be increased.

The cathode used in the present invention preferably includes a cathode layer. In general, it further includes a cathode current collector and a cathode lead connected to the cathode current collector.

The cathode layer used in the present invention contains at least an electroconductive material. As needed, it can further contain at least one of a catalyst and a binder.

The electroconductive material used in the present invention is not particularly limited, as long as it is electroconductive and stable to the electrolyte solution. The examples include a carbonaceous material, a perovskite-type electroconductive material, a porous electroconductive polymer and a porous metal material. Especially, the carbonaceous material can be porous or non-porous. However, in the present invention, the carbonaceous material is preferably porous, because a large specific surface area and many reaction sites can be offered. Concrete examples of porous carbonaceous materials include mesoporous carbon. Concrete examples of non-porous carbonaceous materials include graphite, acetylene black, carbon black, carbon nanotubes and carbon fibers. The content of the electroconductive material in the cathode layer accounts for preferably 10 to 99% by mass of the cathode layer, particularly preferably 50 to 95% by mass of the cathode layer. This is because when the content of the electroconductive material is too small, there is a possible decrease in reaction sites and cell capacity, and when the content is too large, there is a possible relative decrease in catalyst content and may result in poor catalyst performance.

As a cathode catalyst used in the present invention, for example, there may be mentioned an oxygen-activating catalyst. The examples of the oxygen-activating catalyst include platinum group metals such as nickel, palladium and platinum; perovskite-type oxides containing a transition metal such as cobalt, manganese or iron; inorganic compounds containing a noble metal oxide such as ruthenium, iridium or palladium; metal-coordinated organic compounds having a porphyrin or phthalocyanine structure; and manganese oxide. The content ratio of the catalyst in the cathode layer is not particularly limited. However, the content ratio accounts for preferably 0 to 90% by mass of the cathode layer, particularly preferably 1 to 90% by mass of the cathode layer.

From the viewpoint of smooth electrode reaction, the catalyst can be supported by the electroconductive material.

The cathode layer is needed to contain at least the electroconductive material. However, it is more preferable that the cathode layer further contains a binder for fixing the electroconductive material. Examples of binders include polyvinylidene fluoride (PVdF), polytetrafluoroethylene (PTFE) and rubber resins such as styrene-butadiene rubber (SBR). The content ratio of the binder in the cathode layer is not particularly limited. However, the content ratio accounts for preferably 1 to 40% by mass of the cathode layer, particularly preferably 1 to 10% by mass of the cathode layer.

Methods for producing the cathode layer include, but not limited to, the following method, for example: a method in which materials for the cathode layer, including the electroconductive material, are mixed and roll-pressed; and a method in which a slurry is prepared by mixing a solvent with materials for the cathode layer, including the electroconductive material, and then applied to the below-described cathode current collector. Methods for applying the slurry to the cathode current collector include known methods such as a spraying method, a screen printing method, a doctor blade method, a gravure printing method and a die coating method.

The thickness of the cathode layer varies depending on the application of the air cell, etc. For example, the thickness is preferably 2 to 500 µm, particularly preferably 30 to 300 µm.

The cathode current collector used in the present invention collects current from the cathode layer. The material for the cathode current collector is not particularly limited, as long as it is electroconductive and stable to the electrolyte solution. The examples include nickel, chromium, aluminum, stainless-steel, iron, titanium and carbon. These materials can be used only for the surface of the cathode current collector, and can be used for the whole of the cathode current collector. As the cathode current collector, a metal porous body is preferable. The examples include metal mesh, drilled metal foil and a metal foamed body. From the viewpoint of excellent current-collecting efficiency, the cathode current collector preferably has a mesh form. In this case, generally, the cathode current collector in a mesh form is provided inside the cathode layer. In addition, the air cell of the present invention can further include a different cathode current collector (such as a current collector in a foil form) for collection of charge collected by the cathode current collector in a mesh form. In the present invention, the below-described cell case can also function as the cathode current collector.

The thickness of the cathode current collector is, for example, 10 to 1,000 µm, particularly preferably 20 to 400 µm.

The air cell of the present invention can include a separator between the cathode and anode. The separator is not particularly limited, as long as it is generally used for alkaline cells. As the separator, for example, there may be mentioned porous films of polyolefins such as polyethylene and polypropylene; non-woven fabrics made of resins such as polypropylene, and non-woven fabrics such as a glass fiber non-woven fabric; and a cellulose-based separator.

By impregnating these materials which can be used for the separator with the above-described electrolyte solution, these materials can be also used as an electrolyte solution-supporting material.

Figure 2:
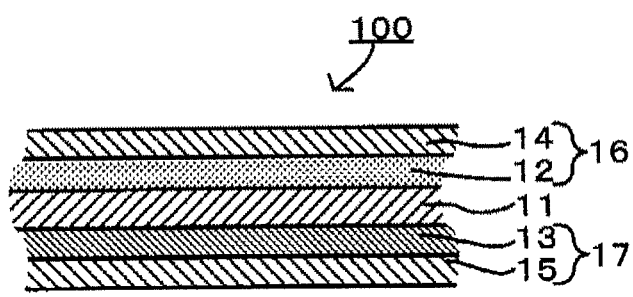
FIG. 2 is a view showing an example of the layer structure of the air cell of the present invention, and is also a view schematically showing a cross section of the same in its layer stacking direction.

FIG. 2 is a view showing an example of the layer structure of the air cell of the present invention comprising the above-described materials, and is also a view schematically showing a cross section of the same in its layer stacking direction. The air cell of the present invention is not limited to only such an example.

Air cell 100 comprises: cathode 16 comprising cathode layer 12 and cathode current collector 14; anode 17 comprising anode active material layer 13 and anode current collector 15; and electrolyte solution 11 disposed between cathode 16 and anode 17.

In general, the air cell of the present invention preferably includes a cell case for housing the above-described electrolyte solution, anode and cathode.

The materials of the cell case are not particularly limited, as long as they are stable to the electrolyte solution. For example, at least the inside of the cell case can include one or more kinds of metal selected from the group consisting of nickel, chromium and aluminum, and one or more kinds of resins selected from the group consisting of polypropylene resin (PP), polyethylene resin (PE) and acrylic resin.

Concrete examples of the form of the cell case include a coin form, a flat plate form, a cylindrical form and a laminate form.

The cell case can be an open-to-the-atmosphere cell case or a closed cell case. The open-to-the-atmosphere cell case is a cell case that has a structure in which at least the cathode layer can be sufficiently exposed to the atmosphere. On the other hand, when the cell case is a closed cell case, the closed cell case is preferably provided with gas (air) inlet and outlet tubes. In this case, it is preferable that the introduced/emitted gas has a high oxygen concentration, and it is more preferable that the gas is dry air or pure oxygen. Also, it is preferable that the oxygen concentration is high at the time of discharge and low at the time of charge.

Depending on the structure of the cell case, an oxygen permeable membrane and/or a water repellent film can be provided inside the cell case.

The water repellent film is not particularly limited, as long as it is made of materials which can prevent leaking the electrolyte solution and diffuse air. For example, the water repellent film may be a porous fluororesin sheet (PTFE) or porous cellulose inside of channel of which is subjected to water repellent treatment.

EXAMPLES

Hereinafter, the present invention will be described further in detail, by way of examples. However, the present invention is not limited to the examples.

1. Evaluation of Solubility

First, a potassium hydroxide aqueous solution was prepared. As the materials of the potassium hydroxide aqueous solution, 8.0 mol/L of a potassium hydroxide aqueous solution (manufactured by Wako Pure Chemical Industries, Ltd.), granules of potassium hydroxide (manufactured by Wako Pure Chemical Industries, Ltd.) and distilled water were prepared. 8.0 mol/L of the potassium hydroxide aqueous solution was used for the next step as it was. Also, using the granules of potassium hydroxide (manufactured by Wako Pure Chemical Industries, Ltd.) and the distilled water, potassium hydroxide aqueous solutions each having a concentration of 10.0 mol/L, 11.7 mol/L, 12.5 mol/L, 13.0 mol/L, 13.4 mol/L and 15.1 mol/L (saturated concentration) were prepared. The concentration of each of the above prepared potassium hydroxide aqueous solutions was calculated from the specific gravity at a temperature of 15° C.

Next, to 10 mL of each of the potassium hydroxide aqueous solutions each having the concentration, 0.06 g of FeS (manufactured by Aldrich) was added. Each of the obtained mixtures was agitated for 30 minutes with an ultrasonic washing machine to prepare each of iron saturated solutions. After centrifuging (4,000 rpm; 10 minutes) thus obtained iron saturated solutions, a supernatant solution was appropriately diluted with dilute nitric acid, and then the quantity of Fe was determined by ICP mass spectrometry. As an analyzer, ELEMENT XR (product name; manufactured by Thermo Fisher Scientific) was used.

The quantified Fe concentration is used as an indicator of iron solubility in the potassium hydroxide aqueous solutions having each of the concentration. That is, the higher Fe concentration means that iron solubility of the potassium hydroxide aqueous solution is higher.

2. Discharge Evaluation

As a working electrode, a reference electrode, a counter electrode, an electrolyte solution and a separator, which are used for a cell for discharge evaluation, the following materials were prepared.

As the working electrode, steel wool (BONSTAR #0000, average wire diameter: 15 µm, BET specific surface area: 0.01 $m^2/g$) was prepared, and nickel mesh and nickel ribbon (they are manufactured by Nilaco Corporation) were prepared for collecting current of the working electrode. First, a rectangular parallelepiped box having a size of 30×30×5 mm was produced using nickel mesh, and nickel ribbon for collecting current was put on the box. Then, 0.8 g of the steel wool was filled in the produced box to produce a working electrode.

As the reference electrode, mercury/mercury oxide electrode (Hg/HgO; manufactured by International Chemistry Co. LTD) was prepared. To the electrode, a liquid having the same KOH concentration as that of an electrolyte solution to be used was charged. But, $K_2S$ was not added to the liquid to be charged.

As the counter electrode, platinum mesh (30×30 mm; 80 mesh; manufactured by Nilaco Corporation) was used.

As the materials of the electrolyte solution, $K_2S$ and the potassium hydroxide aqueous solutions each having the above-mentioned concentration were prepared. To each of the potassium hydroxide aqueous solutions, $K_2S$ was added so that the concentration was 0.01 mol/L, and agitated for 10 to 30 minutes with an ultrasonic washing machine to prepare potassium hydroxide electrolyte solutions each having a concentration of 8.0 mol/L, 10.0 mol/L, 11.7 mol/L, 12.5 mol/L, 13.0 mol/L, 13.4 mol/L and 15.1 mol/L.

As the separator, HMP4810 (product name; manufacture by Mitsubishi Paper Mills Ltd.) was used.

A cell for discharge evaluation was produced by the following steps using the above-described materials.

From the bottom of a beaker cell, a working electrode, a separator and a counter electrode were layered and disposed in this order. Next, a reference electrode was connected to one side of the beaker cell. Then, 10 to 20 mL of the potassium hydroxide electrolyte solution (concentration of 8.0 mol/L, 10.0 mol/L, 11.7 mol/L, 12.5 mol/L, 13.0 mol/L, 13.4 mol/L or 15.1 mol/L) was charged into the beaker cell, and the inside of the cell was defoamed under reduced pressure so that the potassium hydroxide electrolyte solution permeated the whole of the steel wool being the working electrode.

As the discharge evaluation, Multipotentiostat/Galvanostat VMP3 (product name; manufactured by Bio-Logic Science Instruments SAS) was used. The conditions for discharge evaluation are as follows.

First, as a reduction pretreatment, when a potassium hydroxide electrolyte solution having a concentration of 8.0 mol/L was used, a potential treatment was performed for 30 minutes under a potential condition of −1.1 V vs. Hg/HgO. Also, when a potassium hydroxide electrolyte solution having a concentration of 10.0 to 15.1 mol/L was used, a potential treatment was performed for 10 minutes under a potential condition of −1.2 V vs. Hg/HgO.

Next, a discharge evaluation was performed under the following condition.

Discharge current: 27 mA
Cut voltage: 0 V vs. Hg/HgO
Temperature: 25° C.

The iron reaction rate was calculated by the following formula (3).

Iron reaction rate=(capacity $A$)/theoretical capacity of $Fe^{2+}$(960 mAh/g)   Formula (3):

In the above formula, capacity A means one of a capacity of the first plateau and a capacity of −0.76V vs. Hg/HgO.

3. Observation of Surface Structure of Anode Active Material

The surface structure of the anode active material before the discharge evaluation (that is, steel wool which is the row material of the working electrode), and the surface structure of each of the anode active materials after the discharge evaluation in the evaluation cell containing the potassium hydroxide electrolyte solution having a concentration of 8.0 mol/L or 13.4 mol/L were observed with a magnification of 1,000 and 20,000 by means of a scanning electron microscope (SEM; manufactured by JEOL).

4. Considerations

The following Table 1 lists pH of potassium hydroxide electrolyte solution, potassium hydroxide concentration of potassium hydroxide electrolyte solution, iron solubility obtained by the above-described evaluation of solubility, the capacity A obtained by the above-described discharge evaluation, and iron reaction rate obtained by the discharge evaluation. The items are conveniently numbered from 1 to 11 in order that the concentration of the potassium hydroxide electrolyte solution is low. Also, the iron solubility in the potassium hydroxide aqueous solution obtained by the above-described evaluation of solubility is regarded as the iron solubility in the electrolyte solution having the corresponding potassium hydroxide concentration. The pH in the following Table 1 is a value converted from the mol concentration, etc. of the potassium hydroxide aqueous solution which is used under a temperature condition of 23° C. with the following Formula (1) (Formula 14 in Anal. Chem. 1985, 57, 514).

$$pH=14.00-\log(a_w/f_{\pm KOH}m_{KOH})$$   Formula (1):

In Formula (1), $a_w$ is water activity, $f_{\pm KOH}$ is mol activity coefficient of KOH aqueous solution, and $m_{KOH}$ is mol concentration of KOH aqueous solution.

TABLE 1

| Number of KOH electrolyte solution | pH of KOH electrolyte solution | Concentration of KOH electrolyte solution (mol/L) | Iron solubility in KOH electrolyte solution (µg/mL) | Capacity A (mAh/g) | Iron reaction rate (%) |
|---|---|---|---|---|---|
| 1 | 15.9 | 8.0 | 38.7 | 125.8 | 13.1 |
| 2 | 15.9 | 8.0 | 38.7 | 122.2 | 12.7 |
| 3 | 16.5 | 10.0 | 138.7 | 134.0 | 14.0 |
| 4 | 17.1 | 11.7 | 225.5 | 121.9 | 12.7 |
| 5 | 17.1 | 11.7 | 225.5 | 126.4 | 13.2 |
| 6 | 17.3 | 12.5 | 263.6 | 217.0 | 22.6 |
| 7 | 17.5 | 13.0 | 288.6 | 326.5 | 34.0 |
| 8 | 17.5 | 13.0 | 288.6 | 328.0 | 34.2 |
| 9 | 17.7 | 13.4 | 308.6 | 732.0 | 76.3 |
| 10 | 17.7 | 13.4 | 308.6 | 730.0 | 76.0 |
| 11 | 18.4 | 15.1 | 393.5 | 397.1 | 41.4 |

Figure 3:
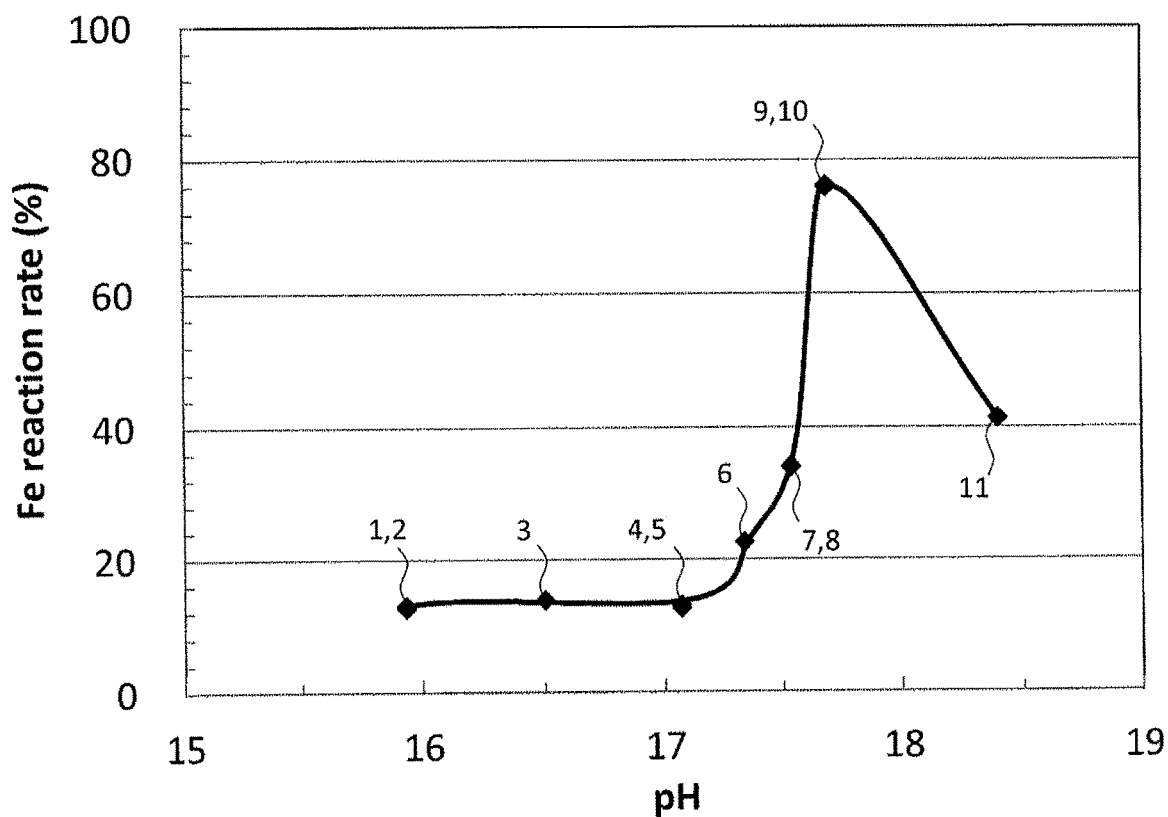
FIG. 3 is a graph showing a relationship between pH of a potassium hydroxide electrolyte solution and iron reaction rate (%) in the potassium hydroxide electrolyte solution.
Figure 4:
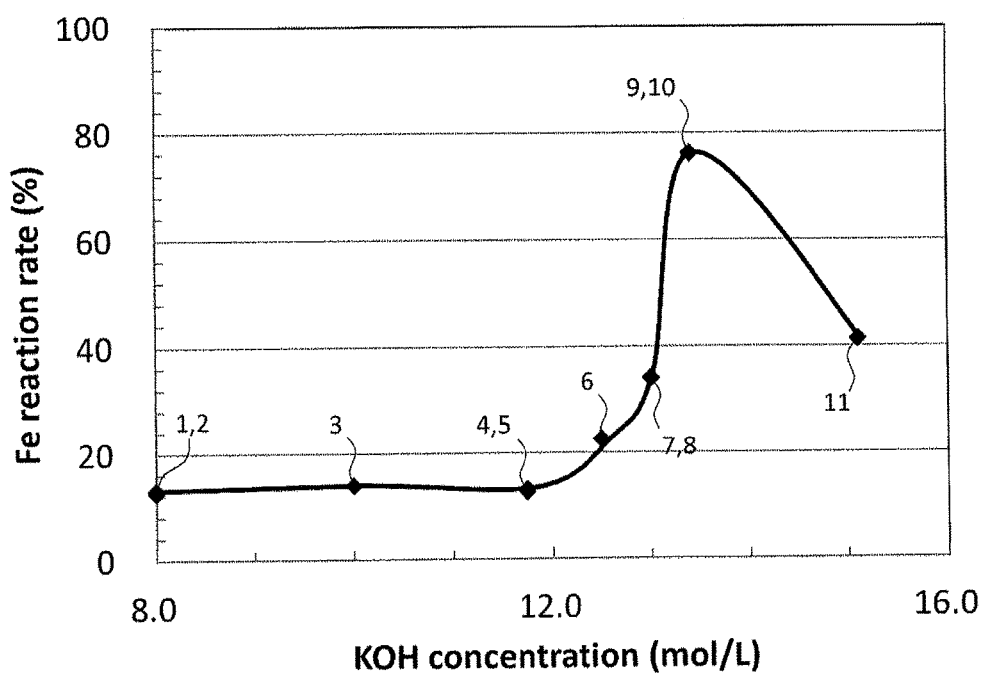
FIG. 4 is a graph showing a relationship between a concentration (mol/L) of a potassium hydroxide electrolyte solution and iron reaction rate (%) in the potassium hydroxide electrolyte solution.
Figure 5:
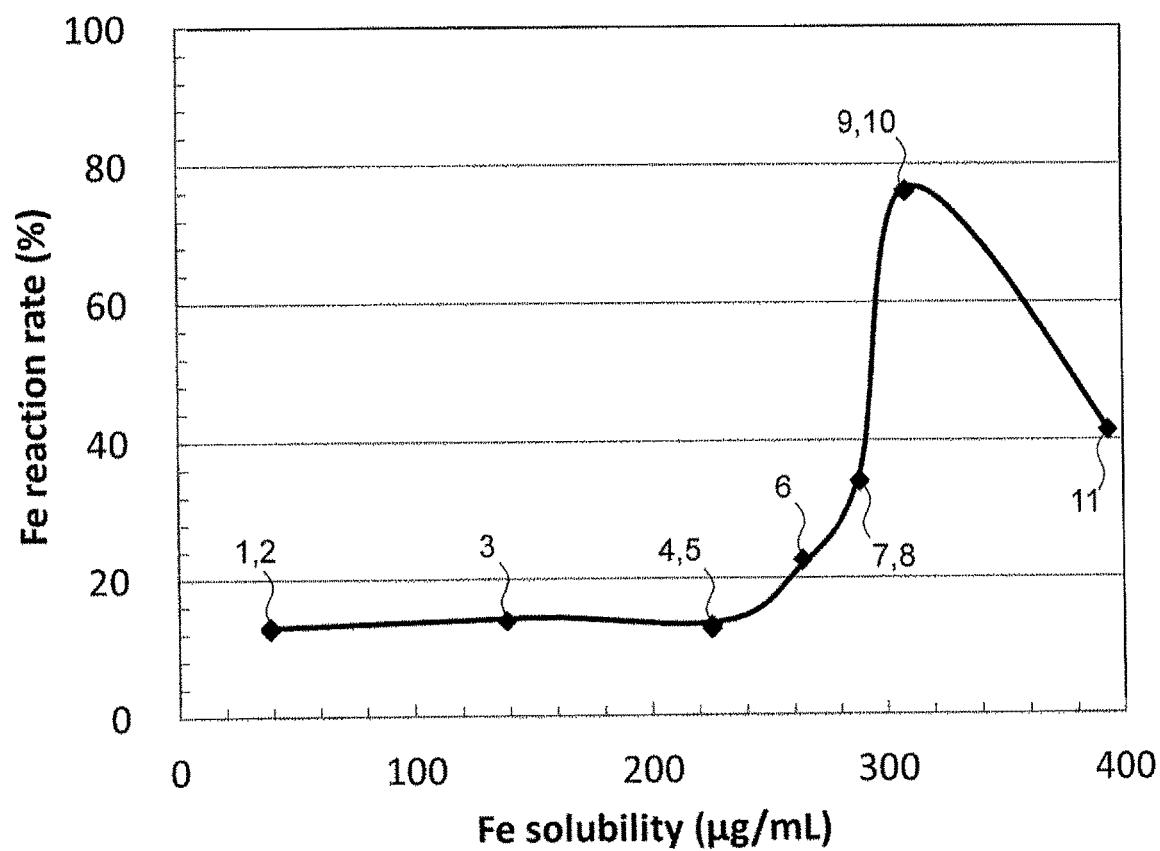
FIG. 5 is a graph showing a relationship between iron solubility (µg/mL) and iron reaction rate (%) in a potassium hydroxide electrolyte solution.

FIGS. 3 to 5 are graphs made based on the data in Table 1. That is, FIG. 3 is a graph showing a relationship between pH of a potassium hydroxide electrolyte solution and iron reaction rate (%) in the potassium hydroxide electrolyte solution. FIG. 4 is a graph showing a relationship between a concentration (mol/L) of a potassium hydroxide electrolyte solution and iron reaction rate (%) in the potassium hydroxide electrolyte solution. FIG. 5 is a graph showing a relationship between iron solubility (μg/mL) and iron reaction rate (%) in a potassium hydroxide electrolyte solution. The numbers 1 to 11 in FIGS. 3 to 5 correspond to the numbers of the potassium hydroxide electrolyte solutions in the above Table 1. Also, each of the numbers 1 and 2, 4 and 5, 7 and 8, and 9 and 10 in FIGS. 3 to 5 has the same value on the vertical axis and the horizontal axis, so that plot are overlapped.

As is clear from Table 1 and FIGS. 3 to 5, in potassium hydroxide electrolyte solutions 1 to 5, iron reaction rate is less than 20%, and a clear difference in iron reaction rate is not confirmed. However, in potassium hydroxide electrolyte solution 6, iron reaction rate exceeds 20%. In potassium hydroxide electrolyte solutions 7 to 8, iron reaction rate exceeds 30%. In potassium hydroxide electrolyte solutions 9 to 10, iron reaction rate increases to almost 80%. On the other hand, in potassium hydroxide electrolyte solution 11, iron reaction rate is slightly decreased to 41.4%. This is considered because the concentration of the potassium hydroxide electrolyte solution is a saturated concentration (15.1 mol/L), and the solid of the potassium hydroxide is likely to be precipitated on the surface of the electrode compared to other electrolyte solutions (potassium hydroxide electrolyte solutions 1 to 10) due to water consumption (water volatilization and water decomposition at a counter electrode side) accompanying the development of the discharge reaction, thereby inhibiting a discharge reaction.

FIG. 6 is a graph showing a relationship between pH of a potassium hydroxide electrolyte solution and iron solubility (μg/mL) in the potassium hydroxide electrolyte solution. The numbers 1 to 11 in FIG. 6 correspond to the numbers of the potassium hydroxide electrolyte solutions in the above Table 1. As is clear from FIG. 6, pH of the potassium hydroxide electrolyte solution is in proportion to the iron solubility in the potassium hydroxide electrolyte solution.

The inventor of the present invention initially expected that the iron solubility in the potassium hydroxide electrolyte solution was in proportion to the iron reaction rate in the potassium hydroxide electrolyte solution. However, as is clear from FIG. 5, in fact, even if the iron solubility exceeds 200 μg/mL, the iron reaction rate was below 20%, and when the iron solubility reached 300 μg/mL, the iron reaction rate was increased to almost 80%. This indicates that other factors except iron solubility relate to the increase in iron reaction rate. As the factors in which the iron reaction rate is rapidly increased in the range from 200 to 300 μg/mL of the iron solubility as described above, the following three factors are considered:

Factor 1: Accompanying the increase in the iron solubility in the potassium hydroxide electrolyte solution, in the solid-liquid interface (that is, between an anode active material (steel wool) and a potassium hydroxide electrolyte solution), before the iron concentration is supersaturated, the diluted iron ions are likely to be expanded far from the anode by natural diffusion, and the formation of discharge product ($Fe(OH)_2$, etc.) is delayed, thereby keeping the state in which the surface of the discharge reaction activity is exposed for a long period of time.

Factor 2: Accompanying the increase in the iron solubility in the potassium hydroxide electrolyte solution, even after the discharge product ($Fe(OH)_2$, etc.) is formed, the discharge product itself is redissolved, thereby exposing the surface of the discharge reaction activity.

Factor 3: Accompanying the increase in the iron solubility in the potassium hydroxide electrolyte solution and/or pH of the potassium hydroxide electrolyte solution, change in the chemical composition on the surface of the precipitated discharge product ($Fe(OH)_2$, etc.) and the increase in pulverization of the structure on the surface are caused, thereby the potassium hydroxide electrolyte solution permeates from the gaps in fine structure to the surface of the reaction activity.

In order to study the above factors 2 and 3 especially, hereinafter, the results of the observation of the surface structure of the anode active material are considered.

Figure 8A:
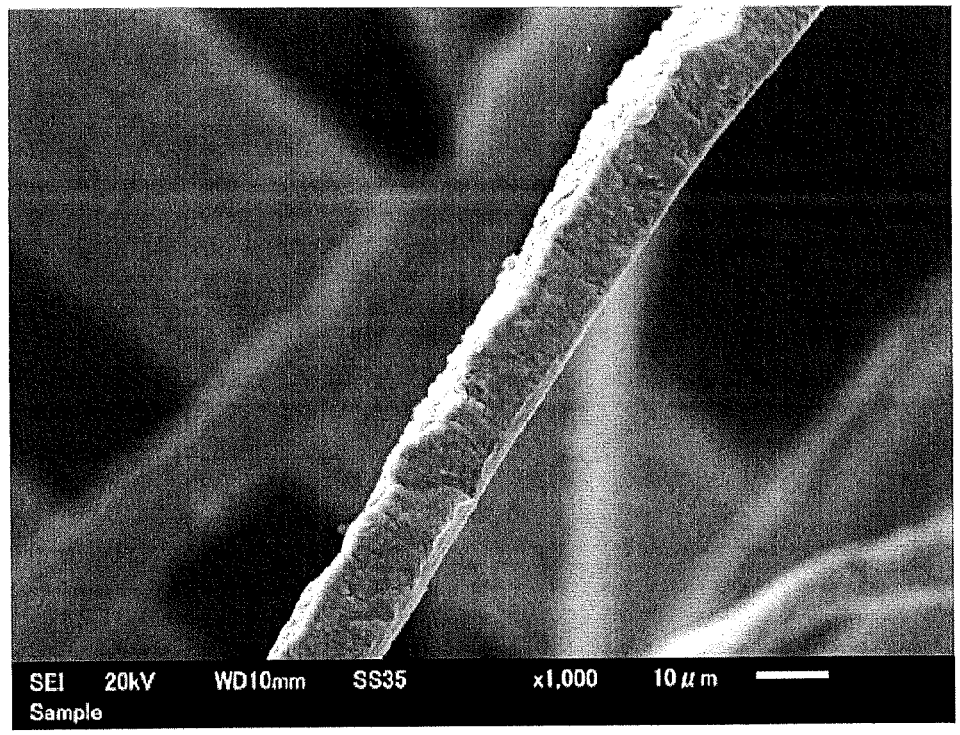
FIG. 8A is a SEM image (magnification of 1,000) of an anode active material before discharge evaluation.
Figure 8B:
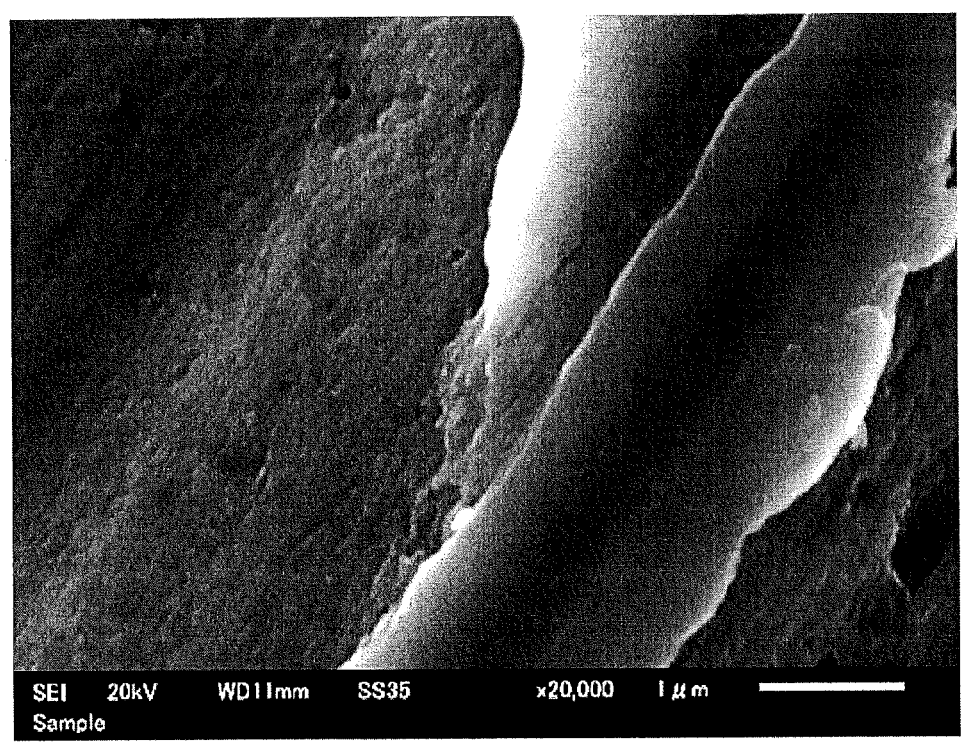
FIG. 8B is a SEM image (magnification of 20,000) of an anode active material before discharge evaluation.

FIGS. 8A to 8B are SEM images (magnification of 1,000 to 20,000) of the anode active material before discharge evaluation. It can be understood particularly from FIG. 8B that the surface of steel wool before discharge evaluation is relatively smooth.

Figure 9A:
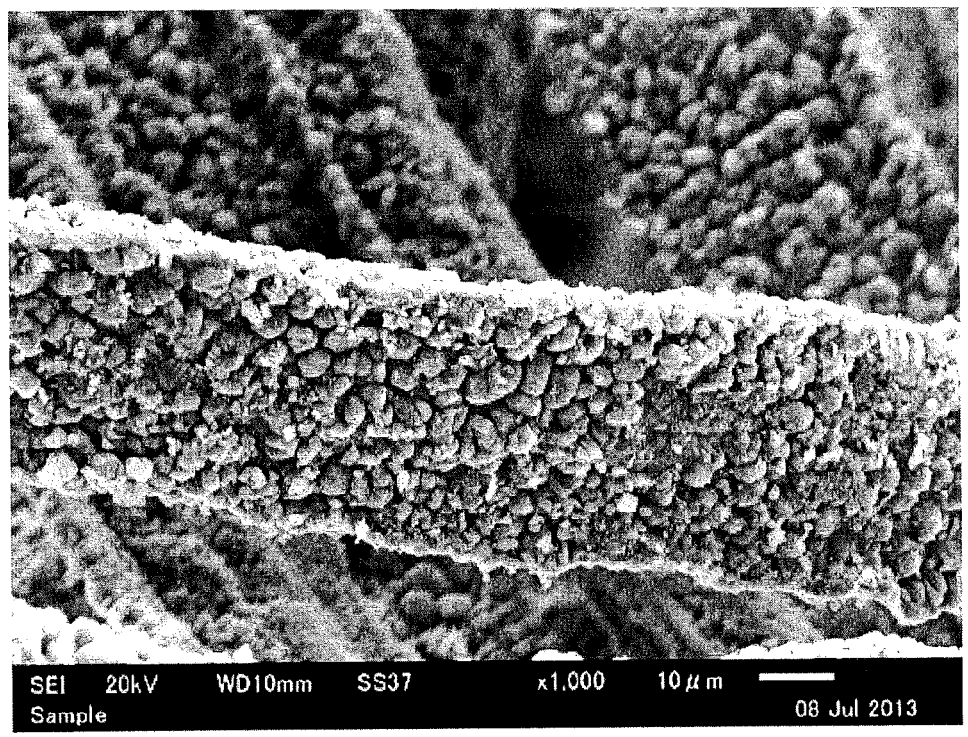
FIG. 9A is a SEM image (magnification of 1,000) of an anode active material after discharge evaluation of an evaluation cell containing a potassium hydroxide electrolyte solution having a concentration of 8.0 mol/L.
Figure 9B:
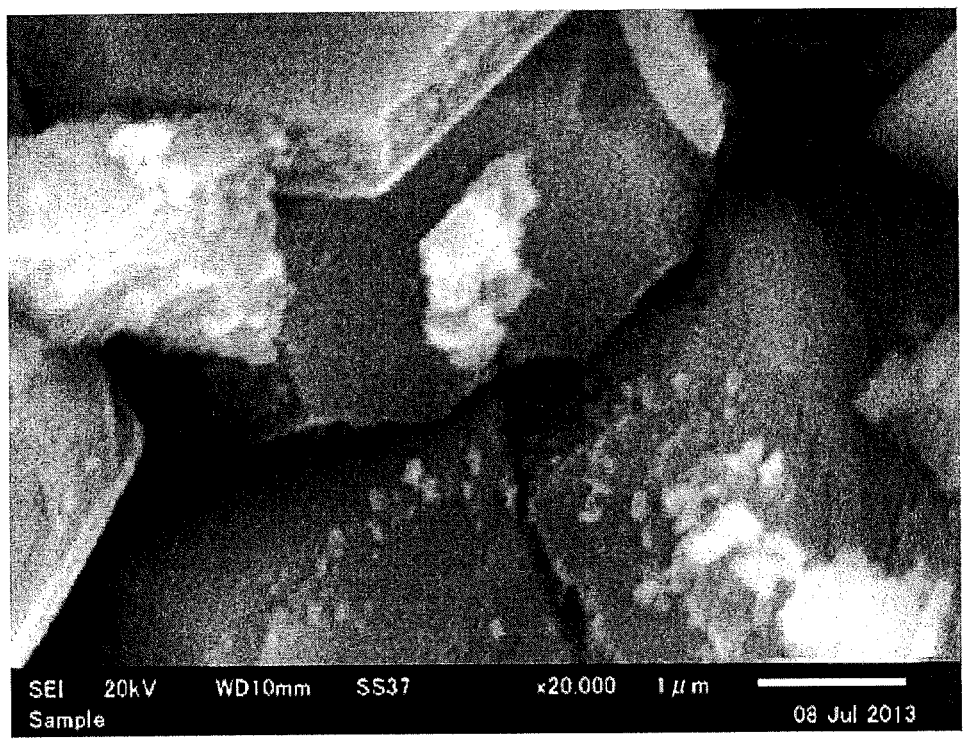
FIG. 9B is a SEM image (magnification of 20,000) of an anode active material after discharge evaluation of an evaluation cell containing a potassium hydroxide electrolyte solution having a concentration of 8.0 mol/L.

On the other hand, FIGS. 9A to 9B are SEM images (magnification of 1,000 to 20,000) of the anode active material after discharge evaluation of the evaluation cell containing the potassium hydroxide electrolyte solution having a concentration of 8.0 mol/L. As is clear from the comparison between FIGS. 9A to 9B and FIGS. 8A to 8B, it can be understood that by conducting the discharge evaluation under an alkaline condition, particles having a diameter of around 3 to 5 μm are precipitated on the surface of the anode active material.

Figure 7A:
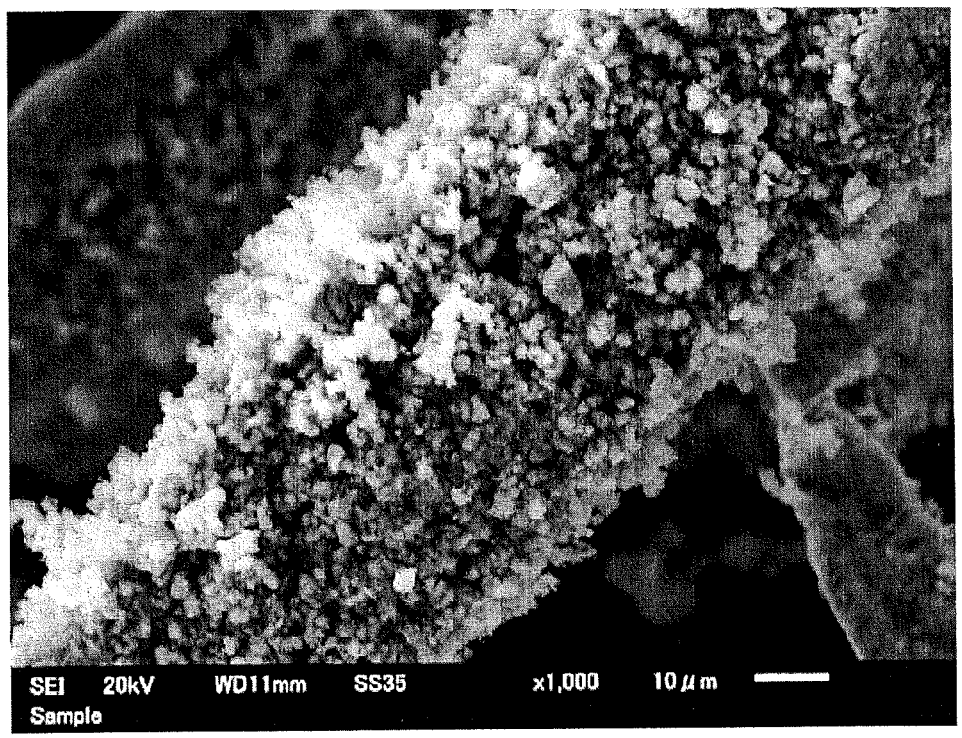
FIG. 7A is a SEM image (magnification of 1,000) of an anode active material after discharge evaluation of an evaluation cell containing a potassium hydroxide electrolyte solution having a concentration of 13.4 mol/L.
Figure 7B:
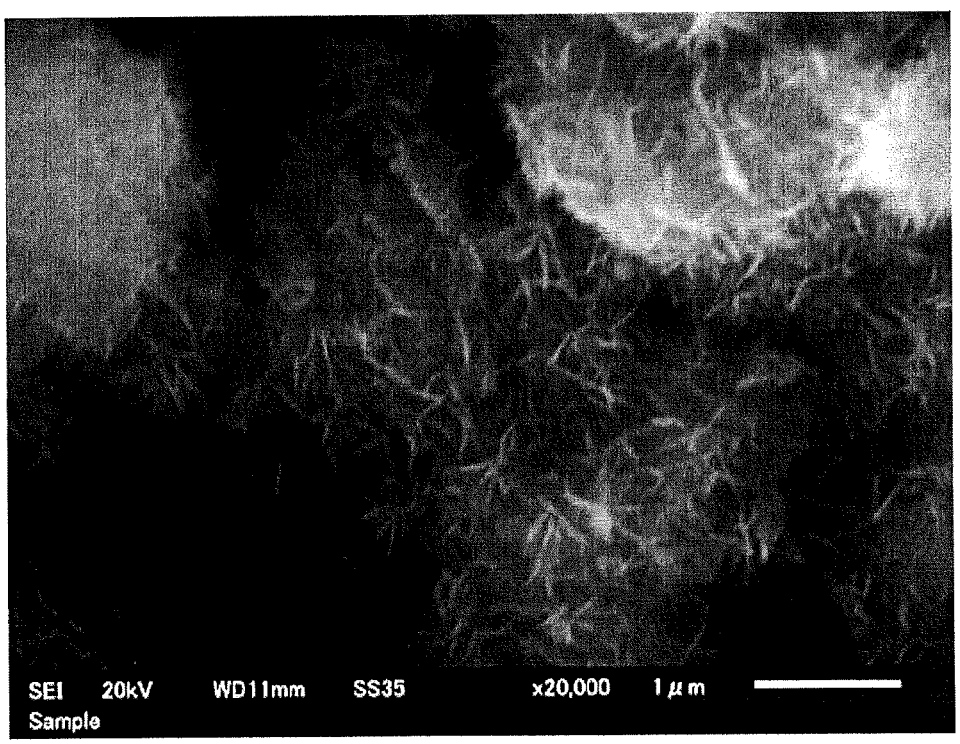
FIG. 7B is a SEM image (magnification of 20,000) of an anode active material after discharge evaluation of an evaluation cell containing a potassium hydroxide electrolyte solution having a concentration of 13.4 mol/L.

FIGS. 7A to 7B are SEM images (magnification of 1,000 to 20,000) of the anode active material after discharge evaluation of the evaluation cell containing the potassium hydroxide electrolyte solution having a concentration of 13.4 mol/L. It can be understood from the comparison between FIGS. 7A to 7B and FIGS. 9A to 9B that the morphologies of the anode active material surface vary depending on the concentration of the potassium hydroxide electrolyte solution. That is, when the potassium hydroxide electrolyte solution having a concentration of 8.0 mol/L is used (FIGS. 9A to 9B), the surface of each of the precipitated particles is flat. On the other hand, when the potassium hydroxide electrolyte solution having a concentration of 13.4 mol/L is used (FIGS. 7A to 7B), fine fibers with a width of several nm and a length of tens of nm are further precipitated on the surface of each of the precipitated particles, and thus the surface of the anode active material has a structure surrounded by the aggregate of the fibers. It can be considered that these fine fibers are generated as a result of frequent repeating of the elution and the precipitation on the surface of the anode active material. As described above, it can be considered that under a strongly basic condition, by changing the morphology of the discharge product, the proportion of a reaction effective area while discharge is increased.

From the above-described results of the observation of the surface structure, it can be understood that the chemical composition and structure of the discharge product when the potassium hydroxide electrolyte solution having high concentration is used for discharge are apparently different from those in the case when the potassium hydroxide electrolyte solution having lower concentration is used. In the present invention, it is considered that resolubility of fibrous discharge product obtained when the potassium hydroxide electrolyte solution having high concentration is used is high, thereby iron reaction rate increases to around 80%.

REFERENCE SIGNS LIST

1. Anode containing iron (Fe)
2. Potassium hydroxide electrolyte solution
3. [Fe(OH)]$_{ad}$
4. Arrow indicating progress of elementary reaction represented by Reaction formula (2a)
5. Arrow indicating progress of elementary reaction represented by Reaction formula (2b)
6. Fe(OH)$_2$
7. Arrow indicating progress of elementary reaction represented by Reaction formula (2c)
11. Electrolyte layer
12. Cathode layer
13. Anode active material layer
14. Cathode current collector
15. Anode current collector
16. Cathode
17. Anode
100. Air cell

The invention claimed is:

1. An air cell comprising:
an electrolyte solution containing a potassium hydroxide solution having a pH of 17.5 or more and 18.4 or less under a temperature condition of 23° C.;
an anode containing iron as an anode active material; and
a cathode,
wherein an average diameter of the anode active material is 0.1 μm or more and 1 mm or less,
wherein the mass ratio of iron in the anode accounts for 10% by mass or more and 100% by mass or less of the mass of the anode, and
wherein the air cell is configured so that a charge-discharge reaction at the anode occurs according to the following formula (2), in which an arrow from the left-sided formula to the right-sided formula indicates a discharge reaction, and an arrow from the right-sided formula to the left-sided formula indicates a charge reaction:

$$Fe + 2OH^- \leftrightarrows Fe(OH)_2 + 2e^- \quad E^0 = -0.975 \text{ V}. \quad \text{Formula (2):}$$

2. The air cell according to claim 1, wherein the anode contains at least one selected from the group consisting of iron metal, iron alloy, and iron compounds, and the cathode comprises a cathode layer containing at least one electro-conductive material.

3. The air cell according to claim 1, wherein the potassium hydroxide solution contains an additive for facilitating a discharge reaction and having a concentration that does not inhibit an electrode reaction and can prevent the formation of a passive film on a surface of the anode.

4. The air cell according to claim 3, wherein the additive is K$_2$S.

5. The air cell according to claim 1, which comprises a separator between the anode and the cathode.

6. The air cell according to claim 1, wherein the average diameter of the anode active material is 1 μm or more and 100 μm or less.

7. The air cell according to claim 1, wherein the average diameter of the anode active material is 10 μm or more and 20 μm or less.

8. An air cell comprising:
an electrolyte solution containing a potassium hydroxide solution having a concentration of 13.0 mol/L or more and 15.1 mol/L or less;
an anode containing iron as an anode active material; and
a cathode,
wherein an average diameter of the anode active material is 0.1 μm or more and 1 mm or less,
wherein the mass ratio of iron in the anode accounts for 10% by mass or more and 100% by mass or less of the mass of the anode, and
wherein the air cell is configured so that a charge-discharge reaction at the anode occurs according to the following formula (2), in which an arrow from the left-sided formula to the right-sided formula indicates a discharge reaction, and an arrow from the right-sided formula to the left-sided formula indicates a charge reaction:

$$Fe + 2OH^- \leftrightarrows Fe(OH)_2 + 2e^- \quad E^0 = -0.975 \text{ V}. \quad \text{Formula (2):}$$

9. The air cell according to claim 8, wherein the anode contains at least one selected from the group consisting of iron metal, iron alloy, and iron compounds, and the cathode comprises a cathode layer containing at least one electro-conductive material.

10. The air cell according to claim 8, wherein the potassium hydroxide solution contains an additive for facilitating a discharge reaction and having a concentration that does not inhibit an electrode reaction and can prevent the formation of a passive film on a surface of the anode.

11. The air cell according to claim 10, wherein the additive is K$_2$S.

12. The air cell according to claim 8, which comprises a separator between the anode and the cathode.

13. An air cell comprising:
an electrolyte solution containing a potassium hydroxide solution having an iron solubility of 288.6 μg/mL or more and 393.5 μg/mL or less under a temperature condition of 23° C.;
an anode containing iron as an anode active material; and
a cathode,
wherein an average diameter of the anode active material is 0.1 μm or more and 1 mm or less of the mass of the anode,
wherein the mass ratio of iron in the anode accounts for 10% by mass or more and 100% by mass or less, and
wherein the air cell is configured so that a charge-discharge reaction at the anode occurs according to the following formula (2), in which an arrow from the left-sided formula to the right-sided formula indicates a discharge reaction, and an arrow from the right-sided formula to the left-sided formula indicates a charge reaction:

$$Fe + 2OH^- \leftrightarrows Fe(OH)_2 + 2e^- \quad E^0 = -0.975 \text{ V}. \quad \text{Formula (2):}$$

14. The air cell according to claim 13, wherein the anode contains at least one selected from the group consisting of iron metal, iron alloy, and iron compounds, and the cathode comprises a cathode layer containing at least one electro-conductive material.

15. The air cell according to claim 13, wherein the potassium hydroxide solution contains an additive for facilitating a discharge reaction and having a concentration that does not inhibit an electrode reaction and can prevent the formation of a passive film on a surface of the anode.

16. The air cell according to claim 15, wherein the additive is K$_2$S.

17. The air cell according to claim 13, which comprises a separator between the anode and the cathode.

* * * * *